United States Patent [19]

Engelberger et al.

[11] 4,150,326

[45] Apr. 17, 1979

[54] TRAJECTORY CORRELATION AND ERROR DETECTION METHOD AND APPARATUS

[75] Inventors: Joseph F. Engelberger; Maurice J. Dunne, both of Newtown, Conn.

[73] Assignee: Unimation, Inc., Danbury, Conn.

[21] Appl. No.: 834,421

[22] Filed: Sep. 19, 1977

[51] Int. Cl.² .................................................. G05B 9/02
[52] U.S. Cl. ..................................... 318/563; 318/568; 361/23; 340/147 MT
[58] Field of Search ....................... 318/568, 563, 565; 361/23, 30; 340/147 MT, 267 R

[56] References Cited

U.S. PATENT DOCUMENTS

| | | | |
|---|---|---|---|
| 3,914,675 | 10/1975 | Konrad | 361/30 X |
| 3,946,296 | 3/1976 | Lahm | 318/568 X |
| 3,987,283 | 10/1976 | Moeller | 318/563 X |

*Primary Examiner*—B. Dobeck
*Attorney, Agent, or Firm*—Mason, Kolehmainen, Rathburn & Wyss

[57] ABSTRACT

Trajectory correlation and error detection apparatus is provided for use with a programmed manipulator to detect movement during an operational work cycle outside a predetermined volumetric envelope. The trajectory correlation and error detection apparatus stores positional data representations of the manipulator during an observed acceptable operational work cycle and compares those stored positional data representations with the actual positional representations during subsequent work cycles to thereby detect an error mode. The detected error during an operational work cycle may be caused by a memory readout malfunction, drive train system malfunction, manipulator positional representation apparatus malfunction, control circuitry malfunction, etc. A warning to nearby personnel and an emergency stop or withdraw command is executed in addition to the normal protective devices on the manipulator apparatus to further ensure against injury to personnel and damage to surrounding machinery, test equipment and work pieces.

18 Claims, 1 Drawing Figure

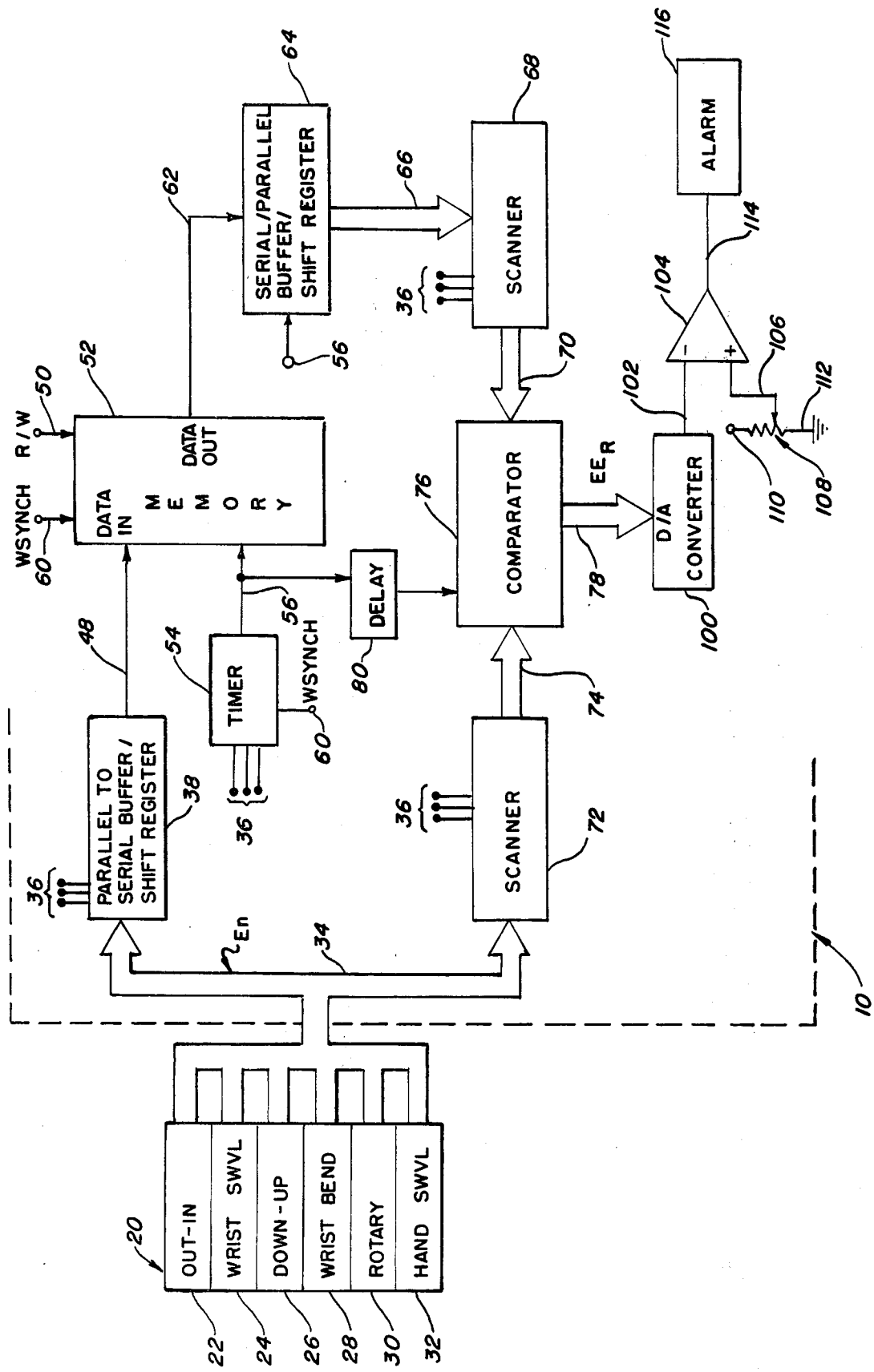

TRAJECTORY CORRELATION AND ERROR DETECTION METHOD AND APPARATUS

BACKGROUND OF THE INVENTION

A. Field of the Invention

The present invention relates generally to error detection apparatus and more particularly to a trajectory correlation and error detector method and apparatus for manipulator apparatus which operates on a stored program to execute a repetitive work cycle in a playback mode.

B. Description of the Prior Art

Programmed manipulator apparatus of various types have been developed that utilize stored command signals. The stored command signals are readout in a replay mode to control the manipulator apparatus by the comparison of the stored command signals and position signals which are developed by encoders representing the present position of the manipulator arm in each of various controlled axes.

Such programmable manipulators are shown, for example, in DeVol U.S. Pat. No. 3,306,471 dated Feb. 28, 1967; DeVol U.S. Pat. No. 3,543,947 dated Dec. 1, 1970; Dunne et al U.S. Pat. No. 3,661,051 dated May 9, 1972; Engelberger et al U.S. Pat. No. 3,744,032 dated July 3, 1973; Engelberger et al U.S. Pat. No. 3,885,295 dated May 27, 1975; DeVol et al U.S. Pat. No. 3,890,552 dated June 17, 1975; British Pat No. 781,465; and Engelberger et al application Ser. No. 625,932 filed on Oct. 28, 1975. The above arrangements have numerous safety and protection devices including emergency stop modes to protect operating personnel in the vicinity of the operating manipulator arm, testing and assembly apparatus in the area of the work station and the work pieces.

While the above described arrangements and their associated protection control circuitry are in general suitable for their intended purpose, it is desirable to ensure that the operation of the manipulator apparatus throughout a repetitive work cycle is within certain tolerance limits or deviations from the desired articulations.

Programmed manipulators provided with the various protective circuitry are extremely reliable and malfunctions are rather uncommon. However, the apparatus operates in an environment where either authorized or unauthorized personnel may be within the working range of the manipulator apparatus and expensive and complex testing and assembly apparatus are also present. Thus, there is a constant need for further protection and error detection apparatus which will closely monitor the operation of the programmable manipulator apparatus.

As discussed hereinbefore, while the programmable manipulator apparatus are designed to be extremely reliable, certain system and component malfunctions can occur; for example, a memory readout error of a rather high magnitude, a drive train system malfunction or a malfunction in the control circuitry involving either the positional encoder systems, the comparator systems or the control circuits themselves.

Many of the manipulator apparatus utilize a servo control system having a servo valve which is actuated in response to a control signal to control movement in a particular axis. If such a servo valve "sticks" or becomes inoperable in an open position such as to cause a maximum rate of change in movement, the manipulator arm may move to an extreme position such as a distance of 10 or 15 feet in a matter of a few seconds.

While certain undesirable movements and articulations beyond predetermined work envelope limits, such as beyond ±45° with reference to the center of the work station, can be programmed to stop the manipulator apparatus instantly, severe damage or injury to nearby personnel could already have been caused.

Further, it is difficult to determine the difference between a programmed articulation at a maximum speed and a system malfunction since the programmable manipulators during portions of their repetitive work cycles are programmed to move at very high speeds such as when working on a conveyor line assembly operation.

One arrangement to detect errors or system malfunctions in the operation of a programmable manipulator utilizes a scheme of monitoring the high position data bits of a digital control signal such as an error signal. This type of apparatus monitors the direction of the error and if the error is increasing rather than decreasing an emergency stop or alarm is actuated. This type of system is based on the theory that the programmable manipulator if operating normally will be controlled to decrease the error control signal as the manipulator arm moves in the proper direction.

However, such an arrangement is not entirely satisfactory since rather large excursions of the arm due to high error control signals in a malfunction situation may occur before the direction of the error is detected. As discussed hereinbefore, any delay in the error detection process might allow the extreme end or tip of the manipulator arm to move on the order of several feet.

Other systems which monitor the data readout of the memory to detect high bit output errors by various methods such as a parity check or predetermined characteristics of the output data have similar drawbacks since they do not monitor the actual position of the manipulator apparatus or detect drive control system malfunctions.

The detection of errors in the repetitive work cycles is further complicated due to the large range of movements throughout the repetitive work cycle; some program steps require relatively large velocities and directional changes while others are rather small. For example, one step may be an intricate assembly step and the next a high velocity movement across the expanse of a large work piece to align the manipulator for another assembly step. Also, variations in the drive control system such as the repetitive behavior of servo control valves or drive train apparatus as caused by the variation of oil temperature or other components further complicates error detection. The normal acceptable variation between successive work cycles in actual cycle time or running makes it difficult to provide an error detection system which accounts for these normal variations while quickly responding to undesirable variations which represent a system malfunction. For example, a manipulator which is synchronized to a conveyor line exhibits large variations in the operating cycle time in accordance with the range of operating speed of the associated conveyor line.

Thus, it is desirable to have an error detection system which does not respond to normal variations in work cycles while rapidly detecting the deviation due to a system malfunction.

SUMMARY OF THE INVENTION

It is therefore a primary object of the present invention to provide a new and improved trajectory correlation and error detection apparatus and method which alleviates one or more of the above described disadvantages of the prior art arrangements.

It is another object of the present invention to provide a new and improved trajectory correlation and error detection apparatus that monitors the operation of a manipulator apparatus throughout a repetitive work cycle and actuates an alarm signal and/or an emergency stop of the manipulator apparatus whenever a deviation is detected which is outside a predetermined volumetric envelope at any position or time of the repetitive work cycle.

It is a further object of the present invention to provide error detection apparatus which actuates an alarm and/or emergency shut down mode for monitoring the operation of a programmable manipulator in a playback cycle when a predetermined deviation is detected between a work cycle which is known to be accurate and the actual positional data of a work cycle being monitored.

It is yet another object of the present invention to provide protection apparatus which automatically records positional data from the manipulator apparatus during a known accurate cycle under the observation of an operator and automatically reads out this recorded data to detect an undesirable operating condition such as a system malfunction by comparing the present positional data of the programmable manipulator with the stored cycle data.

These and other objects of the present invention are efficiently achieved by providing apparatus for detecting the occurrence of a predetermined deviation between the desired position of a programmable manipulator and the actual position at any point throughout a repetitive work cycle. The detection apparatus operating in conjunction with a programmable manipulator includes apparatus for storing data signals which represent the desired positions of the manipulator during a first work cycle and apparatus for comparing the stored signals with the actual positions of the manipulator during subsequent work cycles. The detection apparatus further includes apparatus which is responsive to the comparing apparatus for determining when the deviation of the manipulator apparatus is beyond a predetermined magnitude to indicate an error or emergency mode and to actuate an alarm and/or emergency stop condition.

BRIEF DESCRIPTION OF THE DRAWING

The invention both as to its organization and method of operation together with further objects and advantages thereof will best be understood by reference to the following specification taken in conjunction with the accompanying drawing.

The single FIGURE of the drawing is a schematic, logic and block diagram representation of the trajectory correlation and error detection apparatus of the present invention in conjunction with portions of a programmed manipulator apparatus.

DETAILED DESCRIPTION OF THE PREFERRED EMBODIMENT

Referring now to the drawing, there is illustrated the trajectory correlation and error detection apparatus of the present invention referred to generally at 10 in conjunction with portions of a programmed manipulator apparatus. The programmed manipulator apparatus may be one of the same general type as described in detail in Dunne et al U.S. Pat. No. 3,661,051 and the above referenced Engelberger et al application Ser. No. 625,932 and reference may be had to said patent and said application for a detailed description of this general type of mechanism. However, it should also be understood that the error detection apparatus of the present invention may also be utilized in conjunction with other types of manipulator apparatus.

Generally, the manipulator apparatus includes a number of articulated axes or degrees of freedom, six for example, which are controlled by drive apparatus for each axis. A number of the controlled axes are defined by a manipulator arm extending from the apparatus. Each of the axes of the manipulator is provided with a suitable digital encoder which provides an absolute position measurement of the position of the manipulator in each of the controlled axes at all times. In this connection it will be understood that encoders associated with each axis may for example be in an arrangement as shown in Dunne U.S. application Ser. No. 442,862 filed Feb. 15, 1974 or as described in application Ser. No. 625,932 filed by J. F. Engelberger et al on Oct. 28, 1975.

During a teaching operation various hydraulic motors or other drive train components are used to move the manipulator arm in each of the controlled axes by being energized for a sufficient time interval to bring the manipulator arm to a desired position in all the axes. As this movement is accomplished in each axis, the encoders are correspondingly driven through suitable gearing. When the desired position is achieved in all axes, the digital encoder values are all recorded in a suitable memory where they may be used as command signals during a playback mode of operation of the manipulator.

During the playback, the actual position of the manipulator arm as represented by the digital encoders associated with each axis is compared with the digital command signals previously recorded in the memory during the teaching operation; the output of the comparator providing an error signal which is employed to control the driving motor or drive train in each axis so as to move the manipulator arm to the new commanded position.

For example, during the teaching operation, a sequence of steps may be taught and recorded in an operational work cycle or work assembly operation such as the assembly of a carburetor, the palletizing of a number of boxes or components, or the welding or paint spraying operation of a car body or work piece moving along a conveyor line. During playback, the recorded work cycle is replayed repetitively to perform a desired work operation or assembly operation.

For a specific manipulator apparatus having six degrees of movement, the six axes may be referred to as the out-in, wrist swivel, down-up, wrist bend, rotary and hand swivel axes respectively. The movement in these axes in playback is controlled by comparing the position of the manipulator arm in the six axes with the command signals that are stored in memory and read out in a predetermined sequence representing positional data in a digital format for the six controlled axes.

To provide digital information representing the absolute position of the manipulator apparatus in each of the six controlled axes of movement, a series of six digital encoders are provided referred to generally at 20 in FIG. 1, one for each of the controlled axes as described in more detail in the above referenced U.S. Pat. No. 3,661,051 and application Ser. No. 625,932.

The six encoders, referred to as the out-in encoder 22, the wrist swivel encoder 24, the down-up encoder 26, the wrist bend encoder 28, the rotary encoder 30 and the hand swivel encoder 32 each provide a digital output representing the absolute position data in each axis on a number of output lines, for example 12 to 15 bits of information on 12 to 15 individual output lines. The digital output lines of the encoders 22 through 32 are referred to generally as a data bus 34 and designated $E_n$.

In the control circuitry of the manipulator, the digital encoder data bus 34 is provided to a multiplex scanner switch which sequentially provides the encoder positional signals for the controlled axes to a digital comparator in a repetitive multiplex scanning cycle under the control of a group scanning signal. The positional data from the encoders is presented for each axis to the digital comparator during a specific interval of the scanning cycle.

Similarly, the command signals read out from memory are presented in the same format to the digital comparator which sequentially compares respective positional encoder and command signals for the six controlled axes and provides a digital error signal which may be further converted to an analog voltage by a digital-to-analog convertor. The analog control signals on a multiplex basis are provided by a distributor or scanner stage to the various direction and control circuits and drive trains for the various axes.

In accordance with important aspects of the present invention, the digital encoder data bus $E_n$ referred to at 34 is also connected to the error detection apparatus 10 along with various control and timing signals such as the group scan signal referred to generally at 36. The trajectory correlation and error detection apparatus 10 may be located in a separate housing from that of the manipulator apparatus and detachably connected by suitable connectors and intercabling arrangements. In the alternative, the trajectory correlation and error detection apparatus 10 is assembled as an integral part of the manipulator apparatus.

The encoder data bus 34, $E_n$, is connected to a buffer and shift register stage 38 which also includes the group scan signal 36 as an input. The buffer and shift register stage 38 is effective to output a pulse train of serial data bits corresponding to the digital input data on the encoder data bus $E_n$. For example, assuming the encoder data bus 34 includes 15 data bit lines for each of the six axes for a total of 80 lines, in accordance with the group scan signal 36 an output will be produced including 80 data bits in a preassigned order or sequence corresponding to the data on the data lines of the data bus $E_n$. The group scan signal 36 includes a preassigned scan period or scan interval corresponding to each of the encoders or axes. For example, the six axes out-in, wrist swivel, down-up, wrist bend, rotary and hand swivel may be presented sequentially in the third through eighth scan intervals referred to as the G3 through G8 scan intervals. The G1 and G2 scan intervals are used for control and address purposes in the control system of the manipulator.

The buffer and shift register stage 38 includes an 80 parallel line input shift register which in response to each of the scan interval signals G3 through G8 outputs 80 serial output bits of information on output 48; 15 serial bits during each of the scan intervals. Alternatively, the buffer and shift register stage 38 may include a 15 bit parallel data input shift register and a scanner or multiplex switch such as the scanner 1010 of the above-referenced application Ser. No. 625,932 or the scanner switch 416 of Pat. No. 3,661,051 which is connected to the 80 line input of the data bus 34 to provide a single multiplexed 15 bit line data output. The 15 bit parallel data input shift register is connected to the output of the scanner or multiplex switch and controlled by the group scan signal or group counter signal 36.

After the manipulator apparatus has been conducted through a teach cycle and the appropriate program steps recorded into the main memory of the programmed manipulator, the manipulator is operated under the observation of an operator-programmer wherein suitable adjustments to the recorded program are accomplished as required until the work cycle is performing the desired tasks in an acceptable manner.

At this point and in accordance with important aspects of the present invention, data from the encoders 22 through 32 is recorded at preselected intervals into the error detection apparatus during an observed work cycle to ensure that proper operation is being sampled and recorded.

More specifically, a read/write control 50, designated R/W, of a memory stage 52 of the trajectory correlation and error detection apparatus 10 is activated at the beginning of the observed work cycle. Thus, the serial pulse train of encoder positional data at the output 48 of the buffer and shift register stage 38 is recorded into the memory stage 52 at selected predetermined intervals of the work cycle. The memory stage 52 is independent of and distinct from the main memory of the programmed manipulator.

A timer control stage 54 generates a control output 56 connected to the memory stage 52 to determine the data recording intervals. The frequency or period of the timer 54 determines the intervals at which data points are recorded. The interval between recorded data points is determined by the operating requirements of the manipulator apparatus and the accuracy of error detection that is desired including such variables as the operating speed of the manipulator arm, the apparatus in the vicinity of the work station and the proximity of personnel that may be expected to enter the work station. A timer interval of 500 milliseconds has been found suitable between recorded data points.

The timer control stage 54 includes the group scan signal or group counter input 36 which is logically combined with the timing interval signal to produce a signal at output 56 at the beginning of the next complete scan period following the end of a timing interval. Thus, the output control signal 56 actuates the recording of the data at input 48 into the memory stage 52. The memory stage 52 comprises a conventional memory storage device, for example a disc file or a tape storage unit. As the work cycle is being observed by the operator, positional data for each of the six encoders is recorded into the memory stage 52 at each timing interval and represents the arm positions in all axes of the manipulator apparatus at the preselected timing intervals throughout the entire work cycle.

At the end of the observed work cycle, the trajectory correlation and error detection apparatus 10 is switched out of the record mode. Further, the apparatus 10 is returned to a start program state wherein the memory stage 52 is conditioned to the start of its memory cycle or track. The advancement and starting of the memory cycle in either the read or write modes is automatically synchronized to the programmable manipulator by means of various control signals represented by the synchronization control input 60 referred to as WSYNCH. More specifically, the memory stage 52 is synchronized to the program of the manipulator apparatus and is controllable for programmed pause, wait or stop modes in the manipulator program. Emergency or manually actuated interruptions in the manipulator program also directly control the operation of the memory stage 52.

The WSYNCH input 60 is derived from the various control signals of the manipulator control circuits that synchronize and time the operation of the programmed manipulator. For example, in conjunction with the programmed manipulator apparatus of U.S. Pat. No. 3,661,051 referred to hereinbefore, the WSYNCH signal 60 is derived from the Wait External signal (WEXT) 781, the Acc. No. 1 signal (coincidence Accuracy No. 1 at gate 547) and the inhibit-run (INH) signal 765. The logic function required for WSYNCH is described in terms of positive logic levels as WSYNCH = WEXT · Acc. No. 1 + INH. The INH signal is at ground potential for the inhibit status and a negative potential for normal run operation. Thus, a shifting network is utilized to translate the INH signal to a positive rising edge signal. The WSYNCH signal 60 as defined corresponds to a high logic level for stopping or inhibiting the memory 52 and the timer stage 54 and a low logic level for normal operation. The WSYNCH signal 60 may be inverted to obtain a high logic level for normal operation.

With the manipulator in the replay mode, the manipulator is controlled to move sequentially through the taught points in the work cycle in accordance with the recorded program readout of memory. The recorded data in the memory stage 52 is also sequentially read out.

Thus, the memory stage 52 is advanced throughout its memory cycle to output the data recorded at the preselected intervals at an output 62. The data output at 62 is a serial train of pulses, as recorded, and is connected to a serial to parallel buffer and shift register stage 64 in a synchronized mode to that of the scan cycle control signal 36. The serial to parallel buffer and shift register stage 64 receives the serial train of data pulses, corresponding to the data pulses recorded for every data point at each timing interval. The serial to parallel buffer and shift register stage 64 produces a parallel output on 80 data lines on a data bus output 66 which is maintained according to the control signal output 56 of the interval timer stage 54. Thus, the parallel data bus output 66 is refreshed at each of the timing intervals, for example each 500 msec.

The 80 bit parallel data bus output 66 represents, at any instant of time, the positional data for the six encoders recorded for a specific data recording interval of the work cycle. The data bus output 66 is connected to the input of a scanner or multiplex stage 68 having the group scan signal 36 as a control input. The scanner stage 68 produces a sequential or multiplexed output on a data bus output 70. The data bus output 70 includes 15 lines in the present specific example in the same sequence as described hereinbefore corresponding to the assigned order of the encoder scan intervals.

An encoder scanner switch or multiplexer stage 72 similar to the stage 68 has an input connected to the encoder data bus 34. The scanner stage 72 under the control of the group scan signal 36 sequentially outputs the positional data for each of the encoders on a data bus output 74 in the identical format as that of the scanner stage 38 described hereinbefore, 15 data lines.

A digital comparator 76, operating on a multiplex basis is connected to compare the digital outputs 70 and 74 of the respective scanner stages 68 and 72 and produces a digital output 78 which is correspondingly multiplexed. The digital output 78 represents the difference between respective encoder positional data of the present encoder position during the work cycle and the recorded encoder positions read out from the memory stage 52.

In accordance with important aspects of the present invention and to ensure the proper comparison of the present positional data and the data recorded for a specific point in the cycle, the comparator 76 and the scanner stage 68 include control inputs to actuate the stages for one group scan cycle only after the beginning of a timer interval of the timer stage 54. If the comparator 76 were not disabled and only the scanner stage 72 were disabled, an erroneous high error would occur at the output 78 with a zero input at 74 and an input at 70. Thus, the recorded data from memory stage 52 is compared to the present positional encoder data at the point in the program cycle at which it was recorded. To further ensure that the output 62 of the memory stage 52 has been read out and completely assembled in parallel form to the scanner stage 68, the comparator 76 and/or the scanner stage 68 may be enabled for one complete scan cycle after a predetermined delay time after the beginning of the timing interval at the output of the timer 56.

Specifically, a multivibrator stage 80 or other suitable time delay element may be provided to control the scanner stage 68 and/or the comparator 76. This time delay also compensates for variations in the period of the timer stage 54 and the delay time through the shift register 64 which of course are normally relatively small; on the order of several microseconds. The timer stage 54 is a conventional quartz crystal controlled clock circuit of the type used in digital watches or other high stability frequency sources. The timer stage 54 also includes the WSYNCH synchronization signal 60 as an input to synchronize the timer stage 54 at the start of the recording cycle and playback cycle and after any wait or pause signal periods.

In any event, the multiplexed comparison error signal $EE_r$ on data bus 78 is connected to a digital-to-analog converter stage 100 which converts the digital signal, on the 15 data lines for example, into an analog signal at an analog output 102. The digital-to-analog converter 100 may be of the type described in the aforementioned U.S. Pat. No. 3,661,051.

The analog error output 102 is connected to a first inverting input of a threshold detector stage 104 which is an operational amplifier voltage comparator in a specific embodiment. The threshold detector stage 104 includes a non-inverting input 106 which is connected to an adjustable reference voltage, for example through a potentiometer 108 connected between a positive voltage supply 110 and a ground reference potential 112. The output 114 of the threshold comparator stage 104 represents the deviation of the manipulator apparatus during the present work cycle from an accurate test work cycle for each of the encoders of the controlled axes on a multiplex basis.

If the error voltage at 102 exceeds the selected reference voltage at 106, the threshold detector stage 104 produces at output 114 a predetermined voltage to actuate an alarm stage 116 and/or to actuate an emergency stop or manipulator arm withdrawal device of the manipulator apparatus. The alarm stage 116 may include the actuation of an audible alarm device and a visible alarm device.

As an alternative to the disablement of the comparator 76 and the scanner stage 72 discussed hereinbefore, the digital-to-analog converter stage 100 may be disabled except during the comparison scan cycles.

The trajectory correlation and error detection apparatus 10 then compares the actual positional data of the manipulator axes from the respective encoders with the recorded data at the predetermined intervals to detect the deviation of any of the manipulator axes exceeding predetermined error limits or thresholds. In effect, at each of the predetermined interval data points, the trajectory correlation and error detection apparatus actuates emergency warning modes whenever the tip of the manipulator apparatus, as determined by the controlled axes, deviates beyond a predetermined volumetric error envelope defined about the articulated movements of the work cycle.

Thus, the trajectory correlation and error detector apparatus detects movement of the manipulator beyond the predetermined acceptable volumetric envelope changing in time for each recorded data point. The volumetric envelope is defined by a predetermined deviation by the manipulator in any direction from a work cycle determined to be accurate by observation. In a specific embodiment, the allowed predetermined deviation before actuating an alarm mode is adjusted to twice the normal expected variations due to oil temperature variations, repeatability of drive train apparatus, etc.

In accordance with other important aspects of the present invention and in alternative specific embodiments, the reference input 106 may be varied by the programmed manipulator apparatus during the work cycle under the control of the stored program to allow for increased or decreased error threshold levels at respective program points which are either of increased accuracy requirements or non-critical requirements. Further, a demultiplexer stage may be provided at the output 102 of the digital-to-analog converter 100 that produces an analog output for each of the six axes connected to operate a respective threshold detector stage. In this way, different error detection levels can be programmed for each of the axes.

Concerning the memory stage 52, if a magnetic tape storage device is utilized, the tape may be continuously run to eliminate the starting and stopping of the tape at each predetermined data point. However, a disc file storage device is preferred since data is entered as it is inputted for a more efficient usage of data capabilities. For specific memory devices, the memory stage 52 is controlled in record and replay by the timer stage 54 and the WSYNCH input 60 to the memory 52 is not required.

The parallel to serial shift register stage 38 in an alternative embodiment is designed to output a serial data train for one of the encoder axes each scan cycle to reduce speed and timing requirements wherein six scan cycles are then required to record the data from the six axes. In the case of a two millisecond scan cycle, a total of twelve milliseconds is required to record data. This data record time interval is consistent with the minimum program step time of typical work cycles. Similarly, in an alternative embodiment, the error detection circuitry in replay is also capable of being operated on the basis of a single encoder axis per scan cycle to allow the use of lower speed devices.

In another alternative embodiment, the multiplexed encoder data input 74 may be supplied from the scanner stage of the programmed manipulator control circuitry.

It should also be understood that the trajectory correlation and error detection apparatus may operate on a multiplex format different from that of the programmed manipulator group scan cycle. For example, an independent scan cycle can be generated synchronously with the period of the timer stage 54, for example by a divider or counter stage connected to the timer stage. Further, a slower scan cycle signal could be generated from the group scan cycle signal 36 by the manipulator control circuitry.

While there has been illustrated and described several embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In a programmable manipulator apparatus, the combination of, a manipulator arm movable in a plurality of axes,
    memory means having stored therein a plurality of command signals representing desired positions of said arm in each of said axes and representing an operational work cycle of said manipulator arm,
    means for developing digital position signals representing the position of said arm in each of said axes,
    means responsive to said memory means and said position signal developing means for moving said arm to the positions represented by said command signals, and
    means responsive to said position signal developing means and having stored therein a plurality of said digital position signals representing the positions of said arm at predetermined time intervals through said work cycle for detecting a predetermined deviation between each of said stored position signals and respective ones of said position signals from said position signal developing means at said predetermined time intervals.

2. The combination of claim 1 wherein said detecting means further comprises means for storing a series of said position signals from said position signal developing means as said manipulator arm is moved through a plurality of desired positions defining a first operating cycle and for reading out said stored series of position signals during operating cycles successive to said first cycle,
    means responsive to said storing and read out means and to said position signal developing means for comparing said stored position signals and said position signals from said position signal developing means at corresponding respective positions of said first and said successive operating cycles, said comparing means developing a difference signal related to the difference between said respective stored position signals and said signals from said position signal developing means, and means responsive to said difference signal for determining when said difference signal exceeds a predetermined limit.

3. The combination of claim 2 wherein said position signals are in a parallel data format, said storing and read out means comprising a memory stage operable in a record mode and a readout mode in a serial data format, means responsive to said position signal developing means for transforming said parallel data format to a serial data format, said parallel to serial transforming means providing said serial data format for recording into said memory stage, and means for transforming said data in a serial format read out from said memory stage to a parallel data format for presentation to said comparing means.

4. The combination of claim 3 wherein said comparing means comprises a first and a second multiplex scanning stage and a digital comparator stage, each of said multiplex scanning stages grouping an entered parallel data format into a predetermined number of parallel data groups according to a predetermined multiplex scanning signal, said number of parallel data groups being equal to the number of said axes and each corresponding to a predetermined one of said axes, said first multiplex scanning stage connected between said position signal developing means and a first digital input of said comparator stage, said second multiplex scanning stage being connected between said parallel to serial transforming means and a second digital input of said comparator means.

5. The combination of claim 4 wherein said difference signal determining means is responsive to the digital output of said comparator stage and comprises a digital-to-analog converter stage responsive to said digital comparator output and an analog comparator stage having the output of said digital-to-analog converter stage as a first input and a reference voltage as a second input.

6. The combination of claim 5 wherein said analog comparator stage develops an output whenever said output of said analog comparator exceeds said reference voltage input indicating a predetermined deviation has been exceeded between said stored position signals and said position signals from said position signal developing means.

7. The combination of claim 2 wherein said storing and readout means comprises interval timing means for controlling the recording of said position signals at predetermined intervals and the readout of said stored position signals at predetermined intervals.

8. The combination of claim 7 wherein said interval timing means comprises means for synchronizing the readout of stored position signals to the operation of said manipulator arm.

9. The combination of claim 7 wherein said command signal developing means comprises means for generating predetermined and emergency pause signals, said storing and readout means being responsive to said generating means.

10. Apparatus for detecting the occurrence of a predetermined deviation between the desired positions of a programmed manipulator and respective actual positions during a repetitive work cycle, said programmed manipulator having a manipulator arm controllable in a plurality of axes, absolute position encoders for each of said axes to develop digital position signal representations, a digital memory having stored therein a plurality of command signals representing the desired position of said manipulator, and control apparatus for moving said manipulator arm to said desired position in response to said digital position signals from said absolute position encoders and said command signals stored in said digital memory, said detecting apparatus comprising:

means for storing a series of digital signals from said absolute position encoders representing desired positions of said manipulator;

means for recalling said stored signals during said work cycle;

means for comparing said stored signals with the actual position signals from said absolute position encoders during said work cycle; and means responsive to said comparing means for determining when said manipulator is deviating from said stored desired position representations by a predetermined amount.

11. The method of detecting the occurrence of a predetermined deviation between the desired positions of a programmed manipulator and the respective actual positions thereof during a repetitive work cycle, said programmed manipulator having a manipulator arm controllable in a plurality of axes, absolute position encoders for each of said axes to develop digital position signal representations, a digital memory having stored therein a plurality of command signals representing the desired position of said manipulator, and control apparatus for moving said manipulator arm to said desired position in response to said digital position signals from said absolute position encoders and said command signals stored in said digital memory, the method comprising the steps of:

storing a series of digital signals from said absolute position encoders representing the desired positions of said manipulator during a first work cycle at predetermined time intervals throughout said work cycle;

recalling said stored signals during a work cycle subsequent to said first work cycle;

comparing said stored signals with the actual position signals from said absolute position encoders at said predetermined time intervals during said subsequent work cycle; and determining when said actual manipulator position is deviating from each of said stored desired position representations by a predetermined amount.

12. In a programmable manipulator apparatus, the combination of, a manipulator arm movable in a plurality of axes, program control means for moving said arm over a predetermined path during a playback cycle, means for developing position signals representing the position of said arm in each of said axes as said arm is moved over said path during a playback cycle, said program control means having stored therein a plurality of command signals representing desired positions of said manipulator arm during said playback cycle and being responsive to said position signal developing means, means for recording said position signals at predetermined spaced time intervals as said arm is moved over said path during a playback cycle, and means for comparing said recorded position signals with the position signals developed as said arm is moved over said path during succeeding playback cycles.

13. The combination of claim 12 which includes means connected to the output of said comparing means for producing a control signal when the position signals developed by said position signal developing means differ from said recorded position signals by a predetermined amount.

14. The combination of claim 13, wherein said control signal controls an alarm circuit.

15. In a programmable manipulator apparatus, the combination of:

a manipulator arm movable in a plurality of axes;

means for developing command signals representing desired positions of said arm in each of said axes;

means for developing position signals representing the positions of said arm in a parallel data format in each of said axes;

means responsive to said command signal means and said position signal means for moving said arm to the positions represented by said command signals; and means responsive to said position signal developing means and having stored therein a plurality of said position signals representing the positions of said arm for detecting a predetermined deviation between said stored position signals and said position signals from said position signal developing means;

said detecting means further comprising means for storing a series of said position signals from said position signal developing means as said manipulator arm is moved through a plurality of desired positions defining a first operating cycle and for reading out said stored series of positions signals during operating cycles successive to said first cycle;

means responsive to said storing and read out means and to said position signal developing means for comparing said stored position signals and said position signals from said position signal developing means at corresponding respective positions of said first and said successive operating cycles, said comparing means developing a difference signal related to the difference between said respective stored position signals and said signals from said position signal developing means, and means responsive to said difference signal for determining when said difference signal exceeds a predetermined limit, said storing and read out means comprising a memory stage operable in a record mode and a read out mode in a serial data format, means responsive to said position signal developing means for transforming said parallel data format to a serial data format, said parallel to serial transforming means providing said serial data format for recording into said memory stage, and means for transforming said data in a series format read out from said memory stage to a parallel data format for presentation to said comparing means.

16. The combination of claim 15 wherein said comparing means comprises first and second multiplex scanning stages and a digital comparator stage, each of said multiplex scanning stages grouping an entered parallel data format into a predetermined number of parallel data groups according to a predetermined multiplex scanning signal, said number of parallel data groups being equal to the number of said axes and each corresponding to a predetermined one of said axes, said first multiplex scanning stage connected between said position signal developing means and a first digital input of said comparator stage, and said second multiplex scanning stage being connected between said parallel to serial transforming means and a second digital input of said comparator means.

17. The combination of claim 16 wherein said difference signal determining means is responsive to the digital output of said comparator stage and comprises a digital-to-analog converter stage responsive to said digital comparator output and an analog comparator stage having the output of said digital-to-analog converter stage as a first input and a reference voltage as a second input.

18. The combination of claim 17 wherein said analog comparator stage develops an output whenever said output of said analog comparator exceeds said reference voltage input indicating a predetermined deviation has been exceeded between said stored position signals and said position signals from said position signal developing means.

* * * * *